United States Patent [19]

Hong

[11] Patent Number: 5,689,351
[45] Date of Patent: Nov. 18, 1997

[54] HOLOGRAPHIC MEMORY READOUT WITH REDUCED SPECKLE

[75] Inventor: John H. Hong, Thousand Oaks, Calif.

[73] Assignee: Rockwell International Corporation, Thousand Oaks, Calif.

[21] Appl. No.: 574,464

[22] Filed: Dec. 7, 1995

[51] Int. Cl.$^6$ .............................. G03H 1/10; G03H 1/12; G03H 1/22; G11C 7/00

[52] U.S. Cl. .............................. 359/10; 359/11; 359/32; 365/216; 365/125

[58] Field of Search .............................. 359/3, 10, 11, 359/9, 32, 33; 369/102, 103; 365/124, 125, 216

[56] References Cited

U.S. PATENT DOCUMENTS

| | | | |
|---|---|---|---|
| 5,416,616 | 5/1995 | Jenkins et al. | 359/11 |
| 5,550,779 | 8/1996 | Burr et al. | 365/216 |
| 5,642,210 | 6/1997 | Stoll et al. | 359/10 |

OTHER PUBLICATIONS

Hong et al., "Volume holographic memory systems: techniques and architectures," *Optical Engineering*, vol. 34, No. 8, pp. 2193–2203 (Aug. 1995).

*Primary Examiner*—Paul M. Dzierzynski
*Assistant Examiner*—Audrey Chang

[57] ABSTRACT

A method and apparatus are provided for reducing speckle noise in images read out from holographic memories. An image recorded in the memory is read out using a multiple component readout beam, with each component having the same horizontal orientation but a different vertical orientation. Because the Bragg effect is pronounced only in the horizontal direction, the readout beam components all access the same stored image. Each readout beam component is set to oscillate at a slightly different frequency such that the smallest frequency difference is greater than the reciprocal of the output detector response time. The multiple oscillating readout beam components can be produced by an acoustooptic deflector driven by a wideband electrical signal. The memory readout comprises multiple reconstructions of the desired image, with each image reconstruction oscillating at a slightly different optical frequency. The output detector receives a set of mutually incoherent image reconstructions that reduce the speckle noise through an image averaging effect, thereby improving the quality of the output image.

16 Claims, 1 Drawing Sheet

HOLOGRAPHIC MEMORY READOUT WITH REDUCED SPECKLE

TECHNICAL FIELD

The present invention relates to holographic memory devices and, in particular, to a method of reducing speckle noise in an image read out from a holographic memory.

BACKGROUND OF THE INVENTION

In holographic memory devices, a laser source is used to achieve a high storage capacity for recorded images (or data pages) in a holographic medium, such as a photorefractive crystal. When recording an image in a volume holographic memory, a hologram is formed by the interaction of an image or data bearing object beam with a plane wave reference beam in the holographic medium. Among the many techniques by which images can be recorded in holographic media, two methods are of particular interest for reducing speckle noise. In one method, objects are imaged onto the hologram plane to record image holograms. In the second method, objects are imaged in the vertical dimension but Fourier transformed along the horizontal dimension to record anamorphically imaged holograms. The horizontal dimension is defined by the reference beam multiplexing direction, which is dictated by the anisotropy of the Bragg effect. This is described, along with further background information on holographic memories, in Hong et al., "Volume holographic memory systems: techniques and architectures," *Optical Engineering*, Vol. 34, No. 8, pp. 2193–2203 (August 1995), the teachings of which are incorporated herein by reference.

Because the readout beam in volume holographic memories is derived from a coherent laser, the output image (or data page) can be marred by speckle noise. Speckle noise is generated in holographic memory systems by crystal surface and volume imperfections, dust, air turbulence fluctuations, and other inevitable imperfections in the optical imaging components. Because speckle is an undesirable nuisance associated with coherent optics, there is a need for improved systems in which speckle is reduced in the readout of volume holographic memories.

SUMMARY OF THE INVENTION

The present invention comprises a method and apparatus for reducing speckle noise in images read out from volume holographic memories. During recording with a laser source, a hologram is formed in a holographic medium, such as a photorefractive crystal, by the interaction of an image or data bearing beam with a plane wave reference beam. In an angularly multiplexed hologram, each subsequent image or data page is stored by providing a new image in the data beam to interact with a reference beam having a different orientation in the horizontal direction (or x-axis), as dictated by the anisotropy of the Bragg effect. In the prior art, a particular stored image or data page is read out from the memory by illuminating the holographic medium with a reference wave corresponding to the desired stored image, thereby producing a diffracted beam that reconstructs the stored image.

In the method of the present invention, a desired image is read out using a plane wave readout beam having multiple components, with the plane wave components having the same horizontal orientation on the x-axis but different vertical orientations on the y-axis. In addition, each readout beam component is set to oscillate at a slightly different frequency, such that the smallest frequency difference is greater than the reciprocal of the response time of the output detector. The multiple oscillating readout beam components can be produced by an acoustooptic Bragg cell driven by a wideband electrical signal (such as a frequency chirped signal, for example). The readout beam components all access the same stored image or data page because the Bragg effect is pronounced only along the horizontal x-axis, as described in Hong et al., supra, *Optical Engineering*, Vol. 34, No. 8, at 2196–7. The output generated by the multiple plane wave components comprises multiple reconstructions of the desired image, with each image reconstruction oscillating at a slightly different optical frequency. Thus, the output detector receives a set of superimposed, mutually incoherent image reconstructions, which reduce the speckle noise through an image averaging effect.

A principal object of the invention is reduction of speckle noise in images read out from a holographic medium. A feature of the invention is a multiple component holographic memory readout beam in which each plane wave component has the same horizontal orientation, a different vertical orientation, and a different oscillation frequency. An advantage of the invention is improved image quality from volume holographic memories.

BRIEF DESCRIPTION OF THE DRAWINGS

For a more complete understanding of the present invention and for further advantages thereof, the following Detailed Description of the Preferred Embodiments makes reference to the accompanying Drawings, in which.

DETAILED DESCRIPTION OF THE PREFERRED EMBODIMENTS

Figure 1:
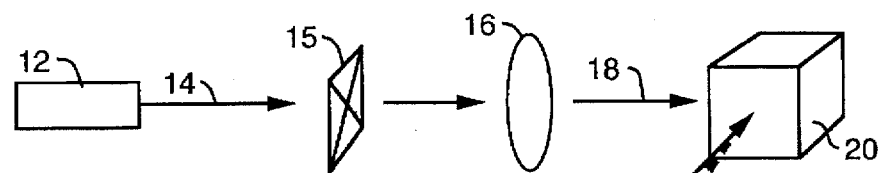
FIG. 1 is a simplified schematic diagram illustrating the recording of images to produce an angularly multiplexed hologram in a holographic medium.
Figure 2:
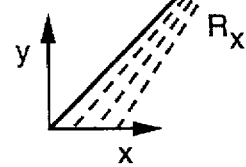
FIG. 2 is a simplified schematic diagram illustrating the present method of reading out an image stored in the holographic medium of FIG. 1.
Figure 2:
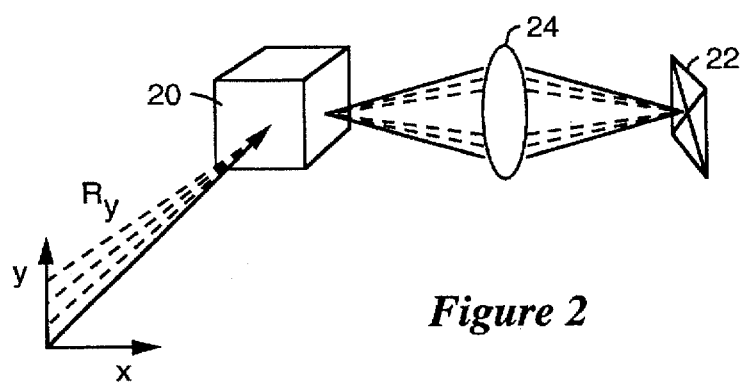

As shown in the simplified schematic diagram of FIG. 1, a coherent light source 12 (typically a laser) provides a beam 14 that is modulated by an object image, typically generated by a spatial light modulator (SLM) 15. Imaging optics 16 direct the object beam 18 into a holographic medium 20 (such as a photorefractive crystal, for example). Object beam 18 interacts with a plane wave reference beam $R_x$ to form a hologram in holographic medium 20. FIGS. 1 and 2 are simplified by omitting commonly understood optical elements such as lenses, mirrors, beam splitters, et cetera. For example, reference beam $R_x$ is generally derived from beam 14 using mirrors and a beam splitter. As is known in the art, a set of angularly multiplexed object patterns can be recorded in holographic medium 20, wherein each object image is recorded using a unique plane wave reference beam $R_x$ that is angularly offset along the horizontal axis (x-axis), as dictated by the anisotropy of the Bragg effect.

After a hologram is recorded in medium 20, a stored object image can be reconstructed, as shown in FIG. 2, by illuminating medium 20 with a readout reference beam (plane wave) having the same orientation as the reference beam Rx used to record that particular object image. The readout reference beam is diffracted by the hologram stored in medium 20 to reconstruct the corresponding object image at an output plane 22. Multiple stored images can be output by changing the readout reference beam orientation in the multiplexing (horizontal, or x-axis) direction. Holographic medium 20 thus provides selective memory recall—only the object image corresponding to the particular readout reference beam orientation is reconstructed as an output image. However, because the plane wave reference beams are spatially coherent, any defect in the holograms (caused by material defects, surface irregularities, and other optical element imperfections, for example) will give rise to coherent noise (speckle) at the output plane 22.

In the method of the present invention, which is illustrated in the simplified schematic diagram of FIG. 2, a hologram stored in holographic medium 20 is read out with a partially coherent readout reference beam $R_y$. Readout beam $R_y$ comprises a plurality of plane wave components. Each plane wave component of readout beam $R_y$ has a unique vertical angle (along the y-axis substantially perpendicular to the x-axis dictated by the anisotropy of the Bragg effect) for detuning from the corresponding (recording) reference beam $R_x$. In addition, each component of readout beam $R_y$ is given a unique temporal frequency, with the minimum frequency difference being greater than the reciprocal of the detection time (i.e., the response time of the output detector). The plurality of components of readout beam $R_y$ generate a corresponding plurality of reconstructions of the stored object image at output plane 22. The plurality of image reconstructions generated from holographic medium 22 and directed to output plane 22 by output optics 24 are coincident and aligned (i.e., superimposed) because of the vertically imaged characteristics of the stored holograms. The mutual incoherence of the plurality of object image reconstructions, which results from the temporal frequency differences in the components of output beam $R_y$ that generate the image reconstructions, produces an averaging of the coherent noise that reduces speckle in the reconstructed image at output plane 22.

Figure 3:
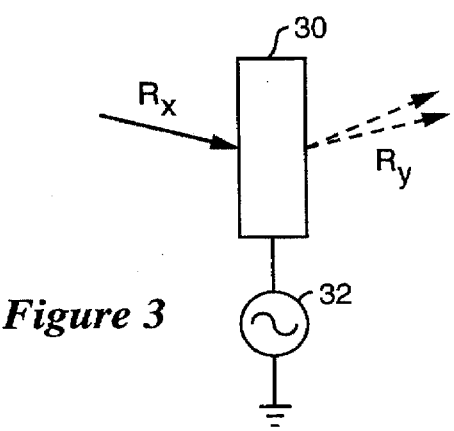
FIG. 3 is a schematic diagram illustrating an acoustooptic Bragg cell driven by a wideband electrical signal to generate the readout beam components shown in FIG. 2.
Figure 4:
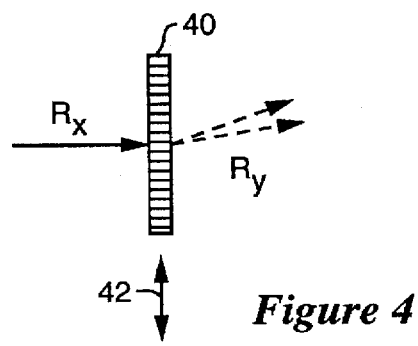
FIG. 4 is a schematic diagram illustrating an acoustooptic Bragg cell driven by a wideband electrical signal to generate the readout beam components shown in FIG. 2.

The mutually incoherent components of output reference beam $R_y$ can be derived from the corresponding reference beam $R_x$ by an acoustooptic deflector 30 driven with a multifrequency waveform 32 (such as a frequency chirped electrical signal, for example), as illustrated in FIG. 3. As a result of acoustooptic Doppler shifts, acoustooptic deflector 30 generates both vertical angle and temporal frequency diversity in the components of output beam $R_y$. As an alternative to acoustooptic deflector 30, a one-dimensional diffuser 40, as illustrated in FIG. 4, can be used to create the vertical angle and temporal frequency diversity in the components of output beam $R_y$ by mechanically scanning diffuser 40 in the direction of the phase or surface variations in the diffuser, as indicated by arrow 42.

Although the present invention has been described with respect to specific embodiments thereof, various changes and modifications can be carded out by those skilled in the art without departing from the scope of the invention. Therefore, it is intended that the present invention encompass such changes and modifications as fall within the scope of the appended claims.

I claim:

1. A method of reducing speckle noise in images read out from a holographic memory exhibiting a Bragg effect along a horizontal axis, comprising the steps of:

providing a readout reference beam having a plurality of plane wave components, each of said plane wave components having the same angle along the horizontal axis, a unique angle along a vertical axis substantially perpendicular to the horizontal axis, and a unique temporal frequency;

illuminating the holographic memory with said plurality of plane wave components; and generating a plurality of coincident, aligned, and mutually incoherent image reconstructions at an output plane, said plurality of image reconstructions averaging coherent noise and thereby reducing speckle.

2. The method of claim 1, wherein the step of providing said readout reference beam further comprises the step of driving an acoustooptic deflector with a multifrequency waveform to generate said plurality of plane wave components of said readout reference beam.

3. The method of claim 2, wherein the step of driving said acoustooptic deflector includes producing said unique vertical angle and temporal frequency of each of said plane wave components.

4. The method of claim 1, wherein said step of providing a readout beam further comprises the step of mechanically scanning a one-dimensional diffuser to generate said plurality of plane wave components of said readout reference beam.

5. The method of claim 1, further comprising the step of providing an output detector at said output plane for detecting said plurality of image reconstructions.

6. The method of claim 5, wherein said step of providing each of said plane wave components with a unique temporal frequency further comprises providing a minimum frequency difference greater than the reciprocal of the response time of said output detector.

7. A method of reducing speckle noise in an output image from a holographic memory, comprising the steps of:

providing a stored image in the holographic memory, the holographic memory exhibiting a Bragg effect along a horizontal axis;

providing a readout reference beam having a plurality of plane wave components, each of said plane wave components having the same angle along said horizontal axis, a unique angle along a vertical axis substantially perpendicular to said horizontal axis, and a unique temporal frequency;

illuminating the holographic memory with said plurality of readout beam components;

generating a plurality of coincident, aligned, and mutually incoherent reconstructions of said stored image at an output plane; and providing a detector at said output plane for detecting said plurality of image reconstructions as the output image and averaging coherent noise to reduce speckle in the output image.

8. The method of claim 7, wherein the step of providing said readout reference beam further comprises the step of driving an acoustooptic deflector with a multifrequency waveform to generate said plurality of plane wave components of said readout reference beam.

9. The method of claim 8, wherein the step of driving said acoustooptic deflector includes producing said unique vertical angle and temporal frequency of each of said plane wave components.

10. The method of claim 7, wherein said step of providing a readout beam further comprises the step of mechanically scanning a one-dimensional diffuser to generate said plurality of plane wave components of said readout reference beam.

11. The method of claim 7, wherein said step of providing each of said plane wave components with a unique temporal frequency further comprises providing a minimum frequency difference greater than the reciprocal of the response time of said detector.

12. A method of reducing speckle noise in an output image from an angularly multiplexed hologram of recorded images in a holographic memory exhibiting a Bragg effect along a horizontal axis, comprising the steps of:

providing a readout reference beam having a plurality of plane wave components, each of said plane wave components having the same angle along the horizontal axis, a unique angle along a vertical axis substantially perpendicular to the horizontal axis, and a unique temporal frequency;

illuminating the holographic memory with said plurality of readout beam components;

generating a plurality of coincident, aligned, and mutually incoherent reconstructions of one of said recorded images at an output plane; and providing an output detector at said output plane for detecting said plurality if image reconstructions as the output image and averaging coherent noise to reduce speckle in the output image.

13. The method of claim 12, wherein the step of providing said readout reference beam further comprises the step of driving an acoustooptic deflector with a multifrequency waveform to generate said plurality of plane wave components of said readout reference beam.

14. The method of claim 13, wherein the step of driving said acoustooptic deflector includes producing said unique vertical angle and temporal frequency of each of said plane wave components.

15. The method of claim 12, wherein said step of providing a readout beam further comprises the step of mechanically scanning a one-dimensional diffuser to generate said plurality of plane wave components of said readout reference beam.

16. The method of claim 12, wherein said step of providing each of said plane wave components with a unique temporal frequency further comprises providing a minimum frequency difference greater than the reciprocal of the response time of said output detector.

* * * * *